(12) United States Patent
Tweedt et al.

(10) Patent No.: US 11,608,743 B1
(45) Date of Patent: Mar. 21, 2023

(54) LOW-NOISE BLADE FOR AN OPEN ROTOR (71) Applicant: General Electric Company, Schenectady, NY (US)

(72) Inventors: Daniel L. Tweedt, West Chester, OH (US); Syed Arif Khalid, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/665,483

(22) Filed: Feb. 4, 2022

(51) Int. Cl.
*F01D 5/14* (2006.01)

(52) U.S. Cl.
CPC ........ *F01D 5/141* (2013.01); *F05D 2220/323* (2013.01); *F05D 2240/302* (2013.01); *F05D 2240/303* (2013.01); *F05D 2240/307* (2013.01); *F05D 2260/961* (2013.01)

(58) Field of Classification Search
CPC .......... F01D 5/141; F01D 5/142; F01D 5/143; F01D 5/145; F01D 5/146; F05D 2240/302; F05D 2240/303; F05D 2240/304; F05D 2240/305; F05D 2240/306; B64C 11/18
See application file for complete search history.

(56) References Cited

U.S. PATENT DOCUMENTS

| | | | |
|---|---|---|---|
| 4,726,737 A | 2/1988 | Weingold et al. | |
| 5,167,489 A | 12/1992 | Wadia et al. | |
| 5,190,441 A | 3/1993 | Murphy et al. | |
| D459,285 S | 6/2002 | Rietsch | |
| 9,279,329 B2 | 3/2016 | Myoren et al. | |
| 9,320,277 B2 | 4/2016 | Desbordes | |
| 9,340,277 B2 | 5/2016 | Breeze-Stringfellow et al. | |
| 9,593,582 B2 | 3/2017 | Dejeu et al. | |
| 9,776,707 B2 | 10/2017 | Louet et al. | |
| 10,202,865 B2 | 2/2019 | Breeze-Stringfellow et al. | |
| 10,288,083 B2 | 5/2019 | Miller et al. | |
| 10,358,926 B2 | 7/2019 | Tweedt et al. | |
| 10,414,486 B2 | 9/2019 | Wood et al. | |
| 10,501,177 B2 | 12/2019 | Tweedt et al. | |
| 10,669,881 B2 | 6/2020 | Breeze-Stringfellow et al. | |
| 2010/0054913 A1 | 3/2010 | Morel | |
| 2015/0291276 A1 | 10/2015 | Zatorski et al. | |

(Continued)

FOREIGN PATENT DOCUMENTS

CN 103180617 B 5/2016

*Primary Examiner* — Justin D Seabe
*Assistant Examiner* — Sang K Kim
(74) *Attorney, Agent, or Firm* — Fitch, Even, Tabin & Flannery LLP (57) ABSTRACT

A blade for an open rotor includes a pressure side and a suction side, the pressure side and the suction side intersecting at a leading edge and a trailing edge, wherein for at least 30% of a span of the blade, the meanline of the airfoil section is shaped such that a relative curvature parameter is greater than 1.75 in a first region, less than 0.75 in a second region, and greater than 1.2 in a third region, wherein the relative curvature parameter of a region is defined by $\Delta\zeta_n/\Delta\zeta_{tot}/\Delta(x/c)_n$ wherein $\zeta$ corresponds to the inverse tangent of the slope of a meanline curve, subscript n indicates the region, and x/c is a chordwise location normalized by the chord, and wherein the first region comprises at least x/c=0.0 to 0.10 and the third region comprises at least x/c=0.85 to 1.0.

19 Claims, 9 Drawing Sheets

(56) References Cited

U.S. PATENT DOCUMENTS

| | | |
|---|---|---|
| 2019/0002086 A1 | 1/2019 | Tweedt |
| 2019/0017396 A1 | 1/2019 | Lopez Guzman et al. |
| 2019/0048724 A1* | 2/2019 | Tweedt ................ F01D 5/142 |
| 2021/0108572 A1 | 4/2021 | Arif |
| 2021/0108595 A1 | 4/2021 | Arif |
| 2021/0115803 A1* | 4/2021 | Nash ..................... F01D 9/02 |
| 2021/0222575 A1 | 7/2021 | Breeze-Stringfellow |

* cited by examiner

LOW-NOISE BLADE FOR AN OPEN ROTOR

TECHNICAL FIELD

The present disclosure relates generally to aircraft propulsion, and more specifically to aircraft engines incorporating an open fan or rotor for propulsion.

BACKGROUND

It is well-known to provide aircraft propulsion using open rotors, defined generally as an apparatus including a rotatable hub carrying an array of airfoils that are configured to produce thrust, and which are not surrounded by an outer shroud.

One type of open rotor is a conventional propeller. These are mainly used for low-speed applications and generally become inefficient at high subsonic speeds.

There is an interest in using open rotors to propel higher-speed vehicles using blades optimized therefor; these types of open rotor are often referred to as "prop fans" or "unducted fans." In high-speed subsonic flight, the combination of rotor rotational speed, blade radius, and flight speed results in blade relative speeds that are supersonic through surrounding air, particularly at the outer span.

BRIEF DESCRIPTION OF THE DRAWINGS

The present disclosure may be best understood by reference to the following description taken in conjunction with the accompanying drawing figures in which:

FIG. 5 is a schematic sectional view taken along cross section plane 5-5 of FIG. 3;

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Also, the drawings omit certain details in the system not needed to fully appreciate certain aspects of the system. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Aspects and advantages of the present disclosure will be set forth in part in the following description, or may be obvious from the description, or may be learned through practice of the present disclosure.

Reference will now be made in detail to present embodiments disclosed herein, one or more examples of which are illustrated in the accompanying drawings. The detailed description uses numerical and letter designations to refer to features in the drawings. Like or similar designations in the drawings and description have been used to refer to like or similar parts of the present disclosure.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Open rotors at high subsonic flight speeds have transonic blade airfoils where supersonic compression and expansion of the flow causes strong pressure pulses to propagate outward from the rotor blades and impact the aircraft fuselage, producing vibration and cabin noise. Since cabin noise is an obstacle to future acceptance of the open rotor engine architecture for commercial aircraft propulsion systems, it is preferable that cabin noise be minimized without compromising good aerodynamic performance.

A transonic rotor blade airfoil design is provided to minimize propeller source noise for cabin acoustics while maintaining good high-speed aerodynamic performance. In some embodiments, competing design goals are satisfied through a combination of aerodynamic solidities, blade count, aft sweep, tip dihedral, leading edge thickness, and chordwise suction-side pressure distributions, all with a near-optimum spanwise aerodynamic loading distribution. In some embodiments, the described rotor blade enables open rotor with high efficiency and lower source noise for cabin acoustics at high-speed cruise conditions and higher aerodynamic solidities for improved takeoff aerodynamics and acoustics. In some embodiments, the location of compression/shock near the trailing edge is more predictable and less sensitive to aerodynamic variations. In some embodiments, the delayed deceleration/diffusion on blade suction surface increases aerodynamic efficiency by prolonging laminar boundary layer. In some embodiments, the rotor blade design described herein contributes to open rotor competitive advantage.

Some conventional blade designs use airfoil chordwise loading distributions with maximum loading forward of mid-chord at aerodynamic design conditions, and generally use lower blade solidities (lower ratio of chord to circumferential spacing) and higher blade aspect ratios, and less sweep and tip dihedral. In some embodiments, the blade design described herein incorporates a combination of features to achieve noise reduction with good aerodynamic performance relative to the conventional open rotor blade.

Figures 1, 2:
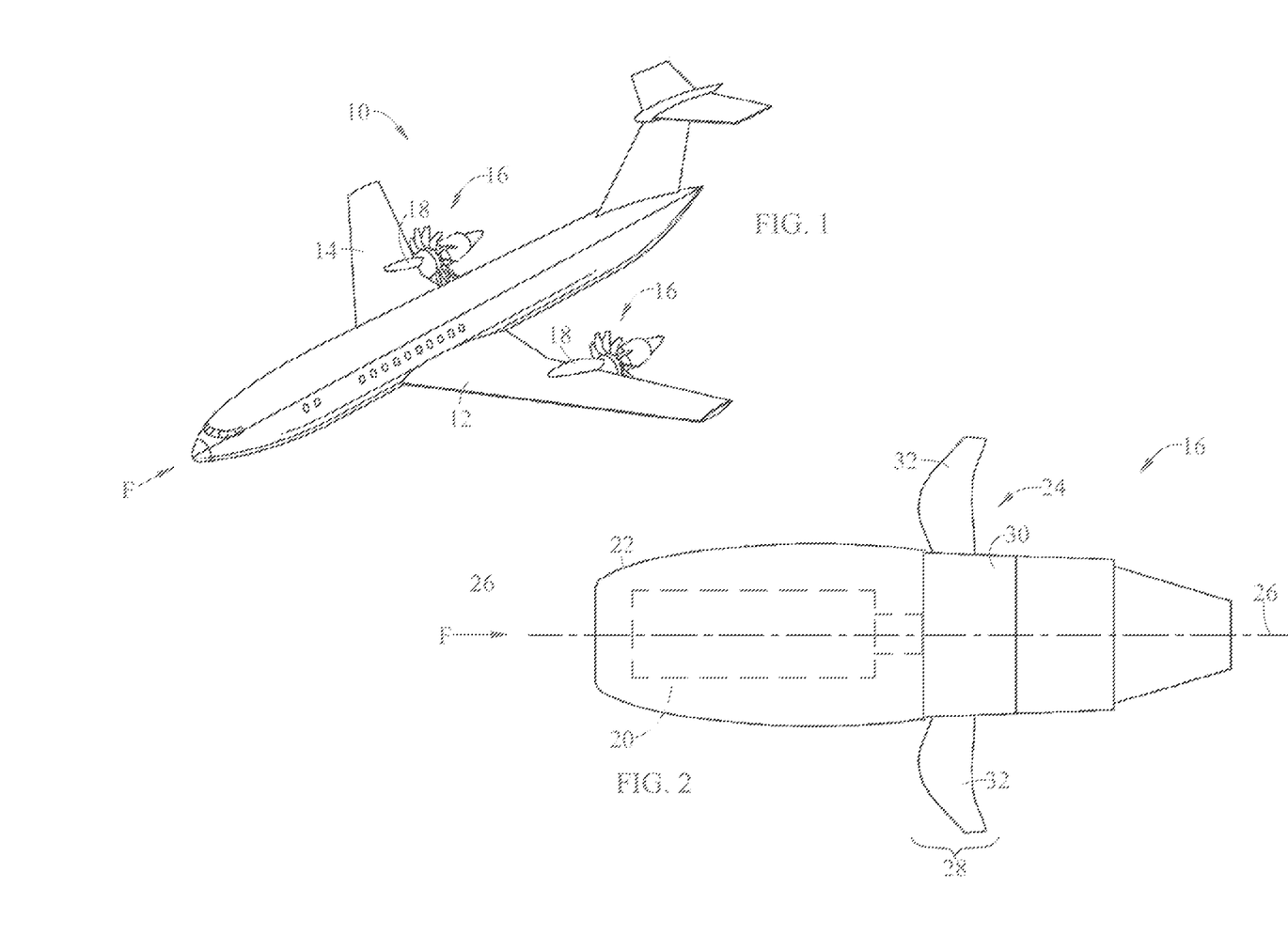
FIG. 1 is an illustration of an aircraft including an exemplary open rotor in accordance with some embodiments.
FIG. 2 is a side view of the exemplary open rotor shown in FIG. 1.

Referring to the drawings wherein identical reference numerals denote the same elements throughout the various views, FIG. 1 illustrates schematically an exemplary aircraft 10 including a pair of wings 12 and 14. Each wing 12 and 14 supports a propulsion device 16 via a pylon 18. Alternatively, one or more propulsion devices 16 may be mounted to any suitable location on aircraft 10.

Referring to FIG. 2, one of the propulsion devices 16 is shown in more detail. The propulsion device 16 includes a prime mover 20 (shown schematically) enclosed in a nacelle 22 and coupled in driving relationship with an open rotor 24 that is mounted for rotation about a centerline axis 26.

It is noted that, as used herein, the terms "axial" and "longitudinal" both refer to a direction parallel to the centerline axis 26, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrows "F" in FIGS. 1 and 2. These directional terms are used merely for convenience in description and do not require a particular orientation of the structures described thereby.

The prime mover 20 may be any device operable to rotate the open rotor 24 at the required speed under expected mechanical and aerodynamic loads. Nonlimiting examples of prime movers include heat engines, motors (e.g. electric, hydraulic, or pneumatic), or combinations thereof (for example electric hybrid drivetrains). In one example, the prime mover 20 may be a gas turbine engine having a core including a compressor, a combustor and one or more turbines. The open rotor 24 may be driven directly by the prime mover 20, or through an intermediate geartrain.

Figure 10:
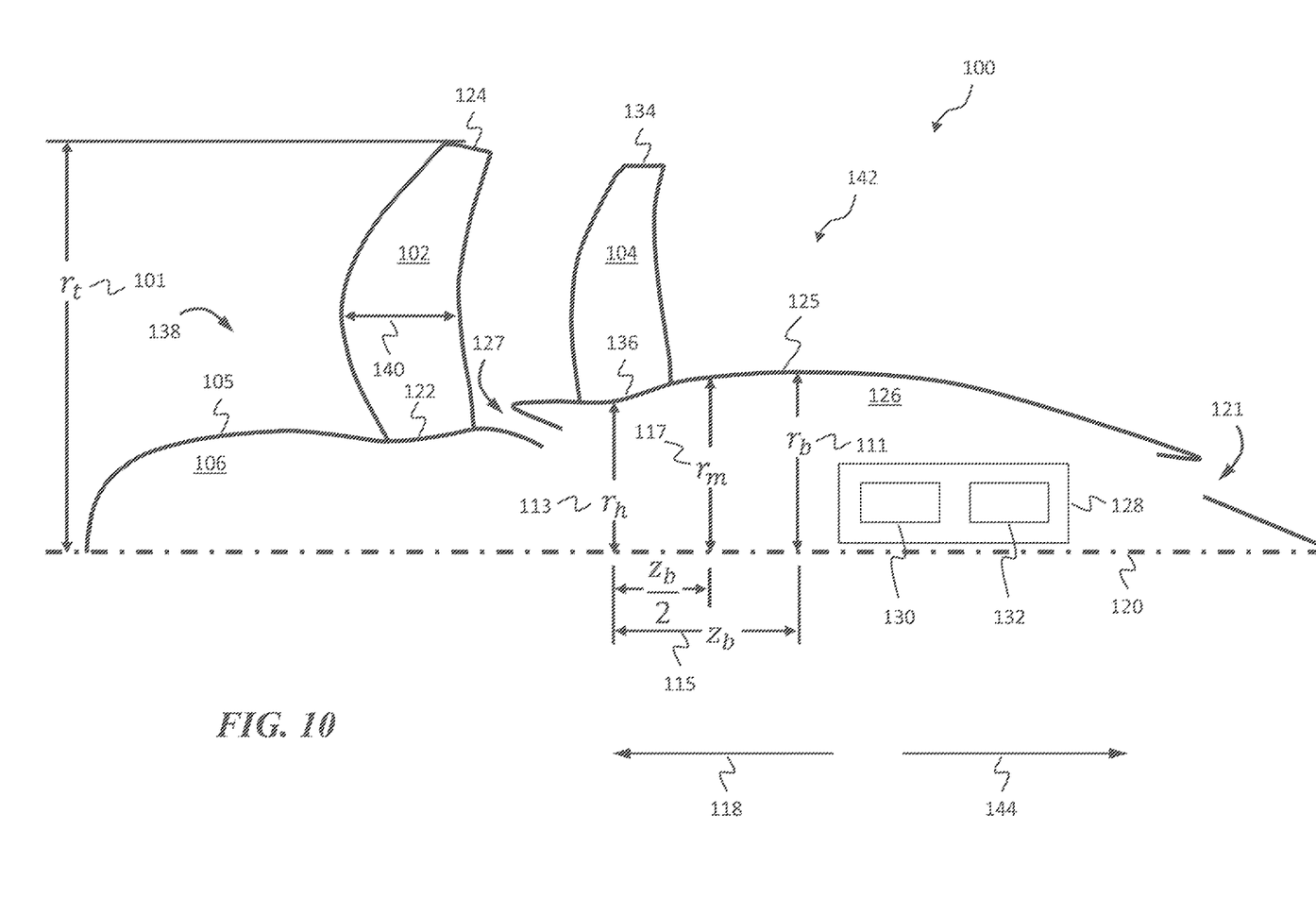
FIG. 10 shows an elevational cross-sectional view of an exemplary unducted propulsion system having an axis of rotation, forward and aft blade assemblies, forward and aft housings, engine inlet and engine exit, in accordance with some embodiments.
Figure 11:
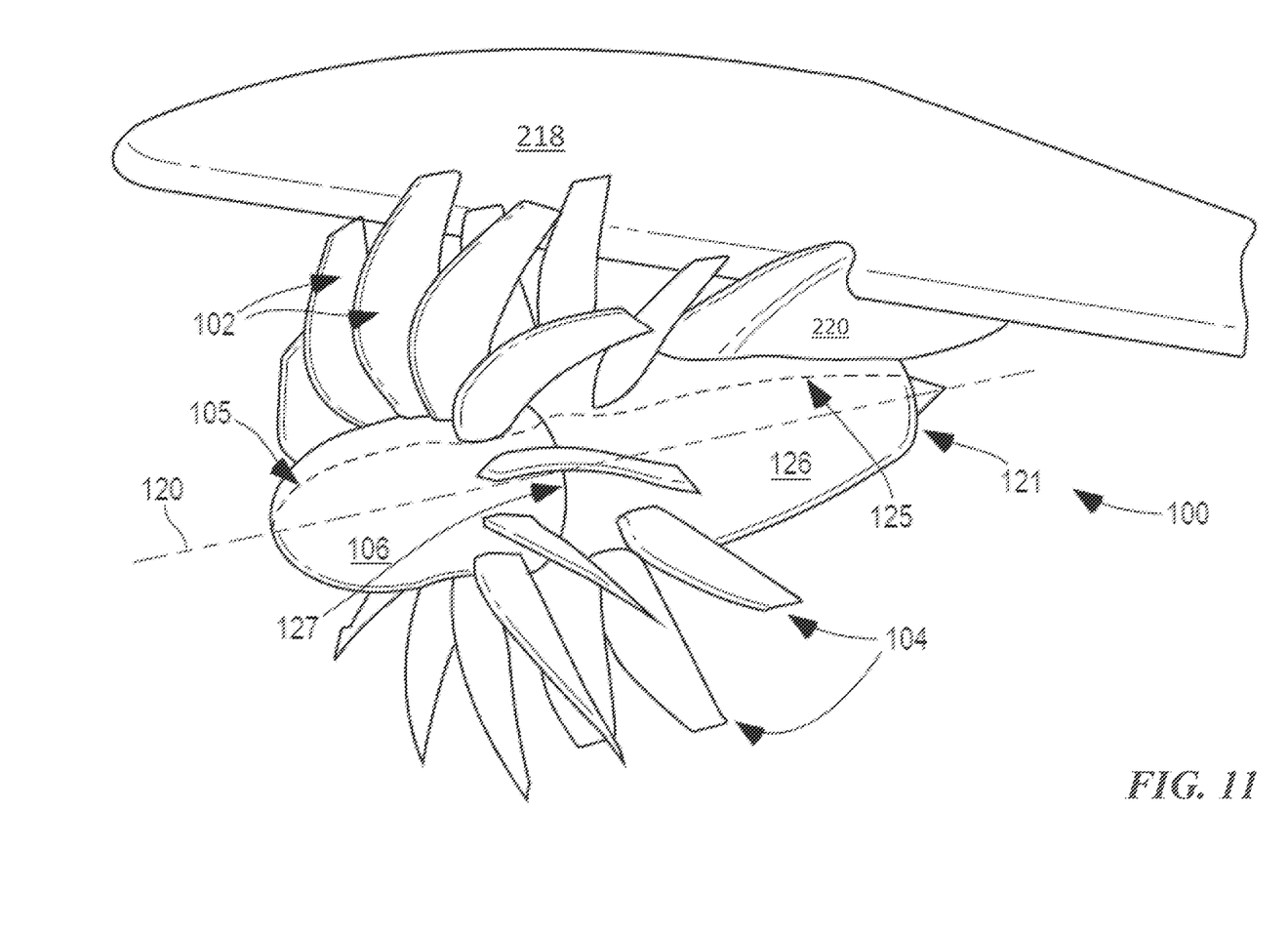
FIG. 11 is a schematic, perspective view of an exemplary gas turbine engine attached to a wing of an aircraft in accordance with some embodiments.

In the illustrated example, the open rotor 24 is a single-stage open rotor including a single blade row 28 comprising a rotatable disk or hub 30 having an annular array of rotor blades 32 extending therefrom. Other examples of open rotors that may use the blade design described herein are shown in FIG. 10 and FIG. 11.

Figure 3:
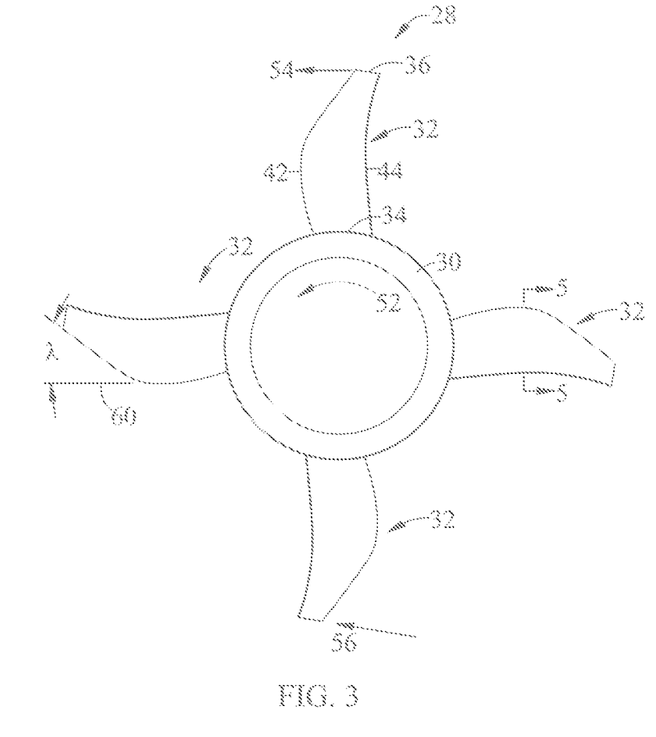
FIG. 3 is a schematic front elevation view of the open rotor shown in FIG. 1.
Figure 4:
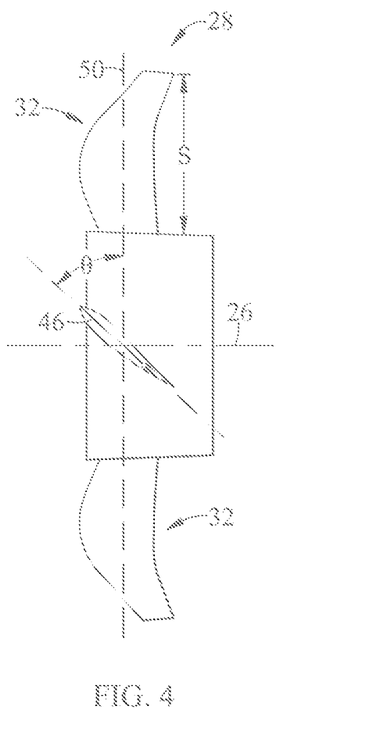
FIG. 4 is a schematic side elevation view of the open rotor shown in FIG. 1.

Referring to FIGS. 3-5, each blade 32 extends from a root 34 at the hub 30 to a tip 36 and includes a generally concave pressure side 38 joined to a generally convex suction side 40 at a leading edge 42 and a trailing edge 44. The blade 32 may be represented as an array or "stack" of individual airfoil sections arrayed along a spanwise stacking line traversing point 45. The spanwise sacking line is generally perpendicular to the meanline 48. FIG. 5 illustrates one such airfoil section at cross section plane 5-5 in FIG. 3. As used herein, an airfoil section may also be defined as the intersection of another surface definition with blade 32 as is found in the art, e.g., a surface of revolution about centerline axis 26. Examples of such surfaces of revolution are a cylinder and a stream surface representing the boundary of constant mass flow.

For each individual airfoil section of the blade 32, an imaginary straight line referred to as a "chord line" 46 connects the leading edge 42 and the trailing edge 44. Also for each individual airfoil section of the blade 32, a curve called the "mean camber line" or "meanline" 48 represents the locus of points lying halfway between the pressure side 38 and the suction side 40. Typically, the blade 32 would incorporate "twist", a feature in which the stacked airfoil sections are rotated relative to each other about the spanwise stacking line traversing point 45. Although not shown in the illustrated example, it will be understood that the blade 32 may incorporate "lean" or "dihedral", a feature in which the stacked airfoil sections are laterally shifted relative to each other, and/or "sweep", a feature in which the stacked airfoil sections are shifted in the chordwise direction.

The blades 32 may be made from suitable high strength materials such as metal alloys (e.g. iron, nickel, or titanium alloys) or composite materials, such as carbon reinforcing fibers in an epoxy matrix, with or without metallic shielding.

In operation, the hub 30 rotates about the centerline axis 26, and the blades 32 sweep through a blade plane 50 which is perpendicular to the centerline axis 26. Airfoil sections of the blades 32 are each disposed at pitch angle θ, dependent on radius (the blades 32 may incorporate twist) and measured between the blade's chord line 46 and the blade plane 50. A relatively small pitch angle θ is typically referred to as a "flat" or "fine" or "low" pitch, and a relatively large pitch angle θ is typically referred to as a "steep" or "coarse" or "high" pitch. It will be understood that in general, the appropriate pitch angle θ for efficient propulsion increases with increasing aircraft speed.

The blades 32 may have a "fixed pitch" configuration in which the airfoil section pitch angles θ of the blades 32 cannot be changed. Alternatively, the blades 32 may have a "variable pitch" configuration in which the airfoil section pitch angles θ of the blades 32 may be uniformly varied (i.e. same pitch angle change for all airfoil sections) in flight. A variable-pitch open rotor may be used to provide thrust efficiently at both high and low speeds. One or more pitch change actuators (not shown) may be used to effect pitch changes.

Each blade 32 has a span (or span dimension) "S" defined as the radial distance from the root 34 to the tip 36, and a chord (or chord dimension) "C" defined as the length of the chord line 46. The chord dimension may be constant over the span S, or it may vary over the span S, as shown.

A spanwise location may be described based on its relative location between the root and tip of the span expressed as a percentage. For example, a spanwise location located at 30% of the distance from the root to the tip may be described as 30% spanwise location. As used herein, a "x % spanwise location" refers to the distance of a location along the span, from root to tip. The root as at 0% spanwise location and the tip is at 100% spanwise location. One or more sections of the spanwise extent may be described as a percentage of the total span. For example, a section having a spanwise length equal to 30% of the full spanwise extent somewhere between the root and the tip may be described as being 30% of the span. As used herein, "x % of the span" refers to the spanwise length of a section or sections relative to the full spanwise extent.

Similarly, a chordwise location may be described based on its relative location between the leading edge and the trailing edge as a percentage. For example, a chordwise location that is 30% from the leading edge to the trailing edge may be described as 30% chordwise location. As used herein, a "x % chordwise location" refers to the distance of a location along the chord, from leading edge to trailing edge. One or more sections of the chordwise extend may be described as a percentage of the total chord length. For example, a section having a chordwise length equal to 30% of the chord extend somewhere between the leading edge and the trailing edge may be described as being 30% of the chord. As used herein, "x % of the chord" refers to a chordwise length of a section or sections relative to the full chordwise extent.

In operation, the blades 32 rotate at various shaft speeds or rotor speeds (expressed as RPM or as an angular velocity), depending upon the phase of flight. The tangential velocity of any given point on the blade 32, that is, its linear speed in a tangential direction, may be computed as the radius of that point from the centerline axis 26 multiplied by the angular velocity, shown at arrow 52.

It will be understood that, for any given rotor speed, the tangential velocity of the blade 32 increases as radius increases, and that the maximum tangential velocity for any rotor speed occurs at the tip 36. The tangential velocity at the tip 36 is generally referred to as the "tip speed", shown at arrow 54.

In flight, the blade 32 experiences a "blade-relative velocity" or "relative Mach number", shown at arrow 56. It will be understood that the blade-relative velocity is a three-dimensional vector quantity with axial, radial, and tangential components. Assuming the radial velocity to be zero, and ignoring secondary factors, the blade-relative velocity at the tip is the vector sum of the tip speed and the flight speed. The blade-relative velocity is approximately equivalent to the speed of the relative wind parallel to the chord line 46 of the blade 32.

Under some operating conditions, for example in the airspeed and tip speed conditions described above, all or portions of the blades 32, for example the outer ½ to ⅓ of the blade span, will experience blade-relative velocities that exceed the local speed of sound. For flow around the blades with substantial regions of both subsonic (Mach numbers less than 1.0) and supersonic (Mach numbers greater than 1.0) blade-relative velocities, the flow field and blade operating regime is called transonic, and for mostly supersonic flow around the blades, the flow field and blade operating regime is called supersonic.

The existence and strength of bow shocks upstream of the blade's airfoil sections in the presence of supersonic relative flow approaching the leading edge depends upon the component, generally varying spanwise along the edge, of the blade-relative velocity perpendicular to the leading edge 42. This component is shown at arrow 58 in FIG. 12. The leading edge 42 includes sweep, which lowers the blade-relative velocity component normal to the leading edge 42 (also referred to as the "edge-normal velocity component") and decreases the bow shock strength. When the edge-normal velocity component is locally subsonic there is no associated bow shock.

Figure 12:
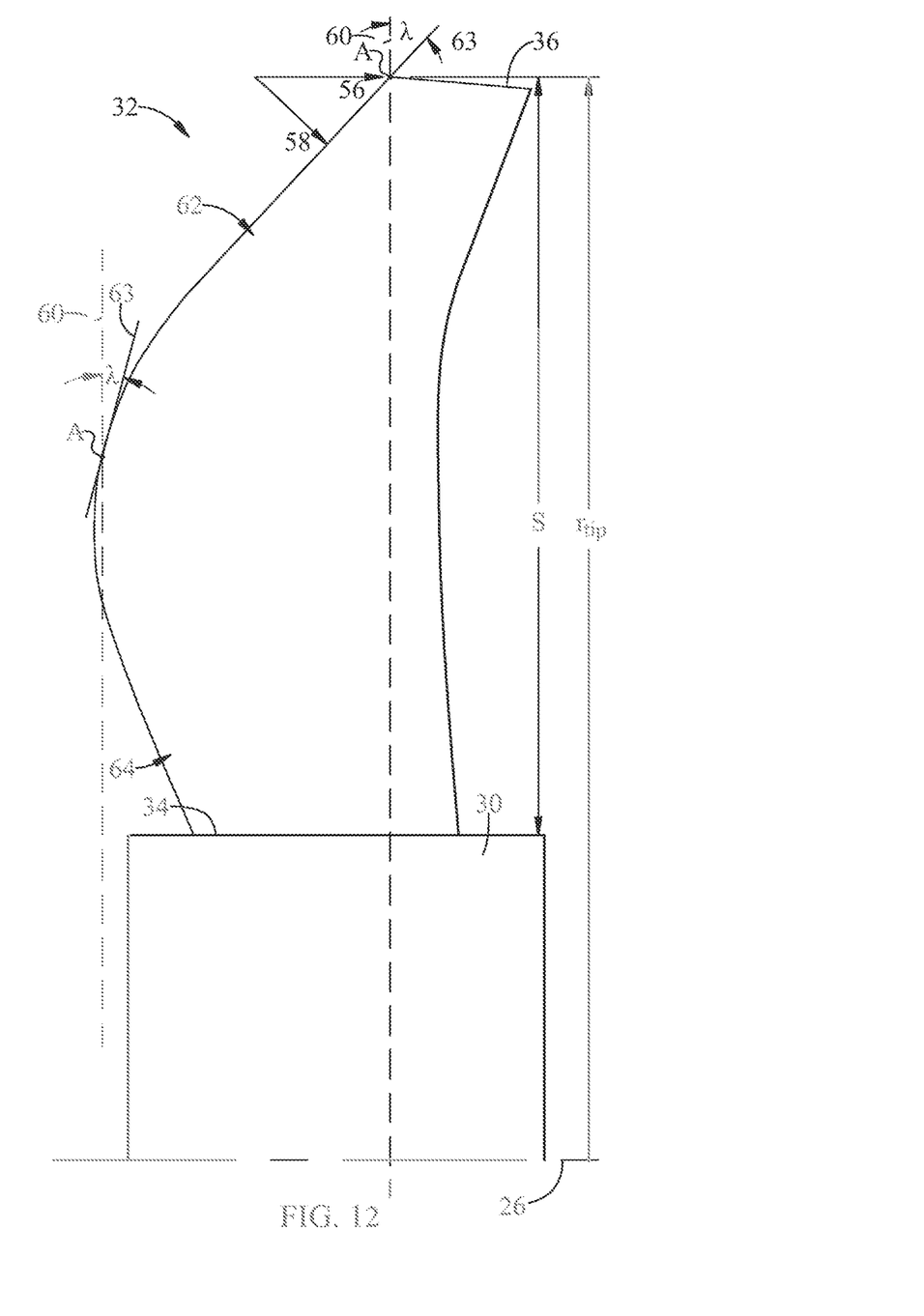
FIG. 12 is a schematic side elevation view of a blade in accordance with some embodiments.

The definition of leading edge sweep as used herein may be understood with reference to FIGS. 5 and 12. A reference line 60 extends in the pure radial direction away from the centerline axis 26 and passes through a local point "A" on the leading edge 42. The angle of local leading edge sweep λ subtends an arc between a radial line passing through point A and a projection of the leading edge tangent line 63 tangent at point A. The projection is onto the plane containing the blade chord line and the radial line that intersects it at point A.

Sweep angle λ is conventionally defined as positive for aft sweep, as depicted in FIG. 3.

The leading edge 42 within an outer portion 62 of the blade 32 incorporates forward or aft sweep (aft sweep is illustrated). The line separating an inner portion 64 from the outer portion 62 would be set depending on the location where blade-relative flow velocities are expected to become supersonic just upstream of the rotor, at some particular operating condition (rotational speed, altitude, and flight Mach number).

For descriptive purposes, reference will be made to the "tip radius", labeled $r_{tip}$, of the blade 32. The tip radius $r_{tip}$ is the radial distance from the centerline axis 26 to the tip 36 of the blade 32 at the leading edge 42. A point located at the tip 36 would be referred to as 100% of tip radius $r_{tip}$, and a point at the centerline axis 26 would be referred to as 0% of tip radius $r_{tip}$. In one example, the demarcation between the outer portion 62 and the inner portion 64 may be located at approximately 65% of the tip radius $r_{tip}$. In the illustrated example, the outer radius of the hub 30 is approximately 30% of the tip radius $r_{tip}$, and so the demarcation at 65% of tip radius $r_{tip}$ would correspond to approximately 50% spanwise location of the span.

For aerodynamic or other reasons, the leading edge 42 of a given blade 32 may incorporate both forward sweep and aft sweep in different portions. In the illustrated example, the inner portion 64 of the leading edge 42 of the blade 32 incorporates forward sweep. For example, the forward sweep in the inner portion 64 may prevent the center of mass of the blade 32 from being too far aft, which might impose excessive mechanical loads on the hub 30.

Referring to FIG. 5, an airfoil section of the blade 32 has a meanline angle 59, which refers to the angle between the tangent to the meanline 48 and centerline axis 26. The meanline angle 59 can be measured at any location along the meanline 48. The value of the meanline angle 59 is a function of both the curvature of the meanline 48 and the pitch angle θ of the blade 32. Thus, the absolute value of the meanline angle 59 will change as the pitch angle θ of the blade 32 changes. However, it will be understood that the overall meanline shape characteristic is unchanging and depends solely on the curvature of the blade 32.

The blade 32 has a thickness 61 which is a distance measured normal to the meanline 48 between the pressure side 38 and suction side 40, which can be measured at any location along the meanline 48. In accordance with conventional practice, a thickness ratio is computed as the absolute value of the thickness divided by the chord length, expressed as a percentage.

A location along the meanline 48 of either the meanline angle 59 or the thickness 61 may be described using a chord fraction, the value of which may be expressed as a percentage. As used herein, chord fraction refers to a chordwise distance of the location from leading edge 42 to a point of interest divided by the chord C. So, for example, the leading edge 42 is located at 0% chordwise location of the chord, and the trailing edge 44 is located at 100% chordwise location of the chord.

The meanline angle at the trailing edge 44 is referred to as the "blade exit angle" 65. This may or may not be equal to the angle between the airflow and the centerline axis 26 directions at the trailing edge 44. The meanline angle at the leading edge 42 is referred to as the "blade inlet angle" 66. This may or may not be equal to the angle between the airflow and the centerline axis 26 directions at the leading edge 42.

A parameter called "total turning" is defined as the absolute value of the difference between the blade exit angle 65 and the blade inlet angle 66.

A maximum thickness of the airfoil section of the blade 32 is represented by the diameter of the largest circle 67 that can be inscribed between the pressure side 38 and the suction side 40.

As used herein, camber is defined as a change in meanline angle 59 between any two points along meanline 48. Curvature of the meanline 48 is calculated as the derivative, or rate of change, of meanline angle 59 with respect to arc length along meanline 48.

In some embodiments, for at least 30% of the span of the blade, the meanline of the airfoil section is shaped such that, in the presence of transonic or supersonic relative velocity conditions, maximum and minimum ideal Mach numbers on the suction side will lie within a 0.08 band for 75% or more of the region between 25% and 80% chordwise location of the chord of the airfoil section. In some embodiments, for at least 50% of the span of the blade, the meanline of the airfoil section is shaped such that, in the presence of transonic or supersonic relative velocity conditions, maximum and minimum ideal Mach numbers on the suction side will lie within a 0.08 band for 75% or more of the region between 25% and 80% chordwise location of the chord of the airfoil section. In some embodiments, for at least 70% of the span of the blade, the meanline of the airfoil section is shaped such that, in the presence of transonic or supersonic relative velocity conditions, maximum and minimum ideal Mach numbers on the suction side will lie within a 0.08 band for 75% or more of the region between 25% and 80% chordwise location of the chord of the airfoil section. In some embodiments, for at least 90% of the span of the blade, the meanline of the airfoil section is shaped such that, in the presence of transonic or supersonic relative velocity conditions, maximum and minimum ideal Mach numbers on the suction side will lie within a 0.08 band for 75% or more of the region between 25% and 80% chordwise location of the chord of the airfoil section.

In some embodiments, for between 30% and 90% of the span of the blade, a maximum value of the thickness of the airfoil section occurs at a location between about 0% to about 35% chordwise location of the chord. In some embodiments, for between 30% and 90% of the span of the blade, the airfoil section has a maximum thickness between about 2% and 7% chordwise location of the chord. In some embodiments, for between 30% and 90% of the span of the blade, the leading edge has a thickness greater than 0.45% of the chord, measured at a 0.5% chordwise location.

In some embodiments, the majority of the leading edge of the outer span of the blade has an aft sweep equal to or greater than a predetermined sweep profile, wherein the predetermined sweep profile is selected to produce a blade-relative velocity component perpendicular to the leading edge, at a tip radius of the blade, of Mach 0.75 or less, and to produce a blade-relative velocity component perpendicular to the leading edge, at 65% of the tip radius, of Mach 0.87 or less, in the presence of transonic or supersonic relative velocities near the blade.

As used herein, Cu refers to the circumferential averaged tangential velocity. Multiplying the Cu times the airstream radius R gives the property RCu. The blade or vane loading at a given radius R is now defined as the change in Rcu across the blade row (at a constant radius or along a streamtube), here forth referred to as $\Delta RCu$ and is a measure of the elemental specific torque of said blade row.

In some embodiments, at under transonic or supersonic relative velocity conditions, the blade has a spanwise $\Delta RCu$ distribution such that at any location between a blade root and 30% span of the blade, the value of $\Delta RCu$ is greater than or equal to 70% of the peak $\Delta RCu$. In some embodiments, at under transonic or supersonic relative velocity conditions, the blade has a $\Delta RCu$ distribution such that at any location between a blade root and 30% spanwise location of the blade, the value of $\Delta RCu$ is greater than or equal to 80% of the peak $\Delta RCu$.

In some embodiments, the tip section of the blade has suction side dihedral such that the tip section leading edge is displaced in the direction perpendicular to the blade section chord line at a radius 85% of a tip radius, by an amount 10% or greater of the circumferential blade tip spacing.

Blade solidity is the ratio of the blade chord, represented by its length, over the circumferential spacing of the blades at a given radius or diameter from the axial centerline axis. In other words, blade circumferential spacing is the circumferential length at a given radius divided by the number of blades in the full fan blade row. Fan blade aspect ratio is the radial height or span of the airfoil portion of the blade divided by an average chord length, and can be calculated by dividing the square of the span by the blade planform area. In some embodiments, the blade row aerodynamic solidity at 0% spanwise location is between 1.0 and 3.6, and at 100% span is between 0.0 and 0.8.

Figure 6:
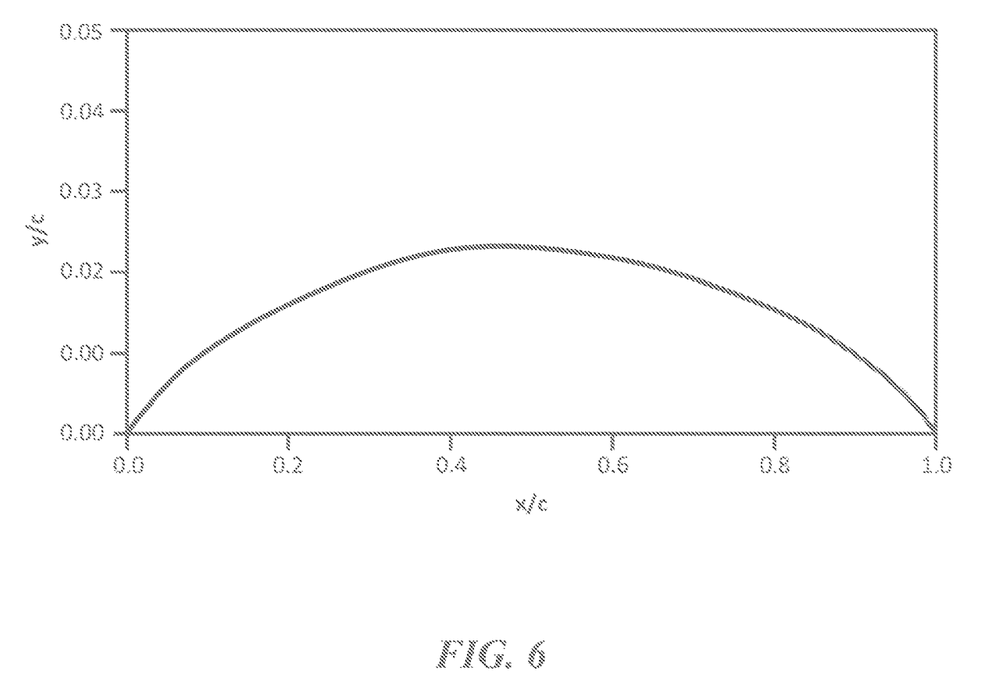
FIG. 6 is a plot of a meanline shape of an exemplary midspan airfoil section of a blade in accordance with some embodiments.

FIG. 6 plots the shape of the meanline 48 of the midspan airfoil section of a blade according to some embodiments. In FIG. 6, the vertical axis represents the distance from the chord line 46 to the meanline 48, measured perpendicular to the chord line 46, expressed as a fraction of chord. This value may be referred to as the "camber rise", which is zero at the leading and trailing edges. It is noted that the scale of the vertical axis in FIG. 6 is different from the scale of the horizontal axis.

In the illustrated example, the location of the maximum value of the camber rise is located within the forward half of the airfoil section, that is, forward of the 50% chord location (indicated by a vertical dashed line). Specifically, the maximum value of the camber rise is located between the 40%-50% chordwise location.

Figure 7:
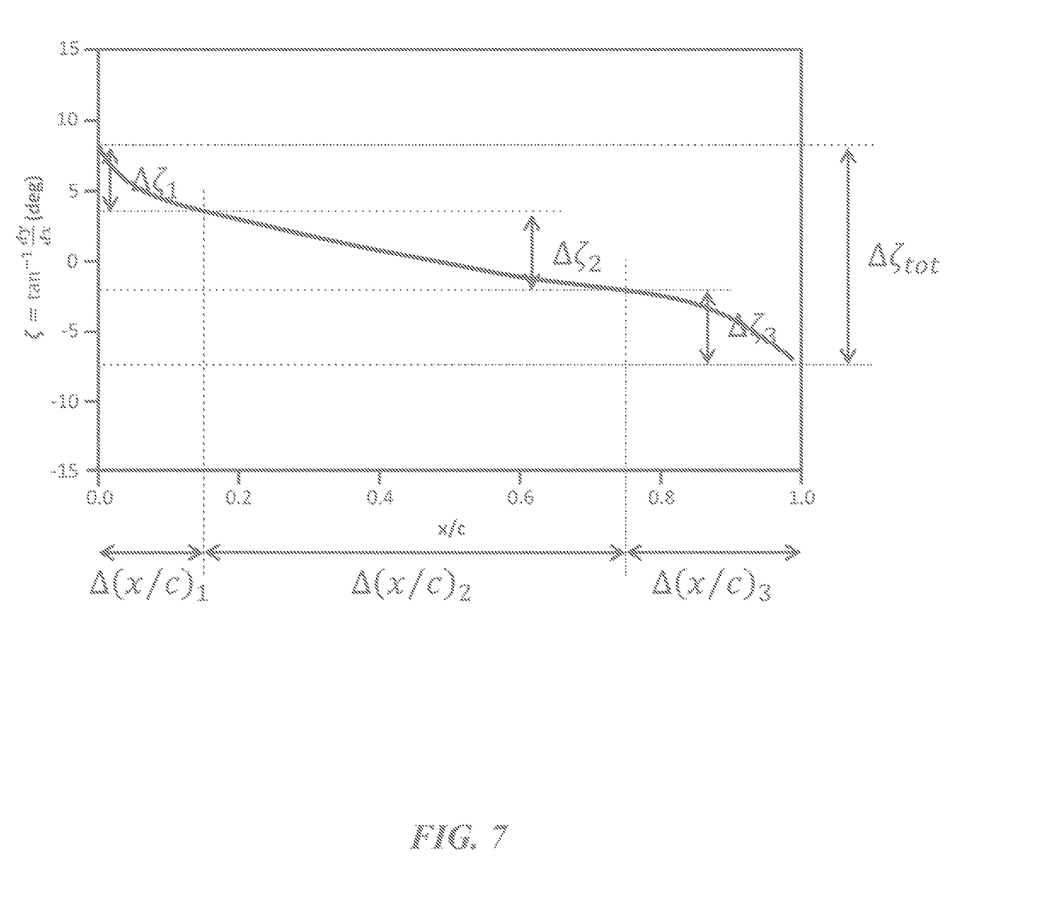
FIG. 7 is a plot of meanline angle as a function of a fraction of chord length of an exemplary midspan airfoil section of a blade in accordance with some embodiments.

FIG. 7 plots the angle distribution of the meanline 48 of a midspan airfoil section of an exemplary blade. In FIG. 7, the vertical axis represents the meanline angle 59 minus the compliment of the pitch angle θ for the section. Meanline angle for a midspan section is shown which quantifies the camber into three regions. Camber corresponds to the change of meanline angle $\Delta \zeta_n$ in each region. The relative curvature parameter of a region is defined by $\Delta \zeta_n / \Delta \zeta_{tot} / \Delta (x/c)_n$, wherein ζ corresponds to the inverse tangent (arctangent) of the slope of a meanline curve, subscript n indicates the region, $\Delta \zeta_{tot}$ corresponds to a total change in meanline angle (the difference between the leading- and trailing-edge meanline angle for a particular blade section), and x/c is the chordwise location normalized by chord. In the example shown in FIG. 7, the relative curvature parameter $\Delta \zeta_1$ of the first region ($\Delta(x/c)_1$)) is high, at 1.99, the relative curvature parameter $\Delta \zeta_2$ of the second region ($\Delta(x/c)_2$)), is low, at 0.59, and the relative curvature parameter $\Delta \zeta_3$ of the third region ($\Delta(x/c)_2$), is medium, at 1.39.

In some embodiments, the first region comprises at least x/c=0.0 to 0.10 and the third region comprises at least x/c=0.85 to 1. In some embodiments, the first region corresponds to x/c=0.0 to 0.15, the second region corresponds to x/c=0.15 to 0.75, and the third region corresponds to x/c=0.75 to 1.0. In some embodiments, for 30% of the span of the blade, the meanline of the airfoil section is shaped such that the relative curvature parameter is greater than 1.75 in a first region, less than 0.75 in a second region, and greater than 1.2 in a third region. In some embodiments, for 50% of the span of the blade, the meanline of the airfoil section is shaped such that the relative curvature parameter is greater than 1.75 in the first region, less than 0.75 in the second region, and greater than 1.2 in the third region. In some embodiments, for 70% of the span of the blade, the meanline of the airfoil section is shaped such that the relative curvature parameter is greater than 1.75 in the first region, less than 0.75 in the second region, and greater than 1.2 in the third region.

In some embodiments, a blade design described herein may be used by powering the open rotor 24 with the prime mover 20 to propel the aircraft 10 in atmospheric flight, such that a relative velocity at the leading edge 42 within an outer portion thereof is transonic or supersonic. For example, these conditions may occur at a flight speed between about Mach 0.7 to about Mach 0.86. For example, the open rotor 24 may be operated at a tip speed greater than about 152 m/s (500 ft/s) and a flight Mach number greater than about 0.72.

In general, the term "propelling the aircraft" as used herein refers to an approximately steady-state, sustainable condition achievable by operation of the prime mover 20, for example takeoff, climb, descent, and/or cruise flight, and not to conditions characterized or dominated by transient effects, e.g. achieved in a rapid descent or dive. In some embodiments, the blade described herein is part of an aircraft with designated cruise flight Mach number at or above 0.74.

Figure 8:
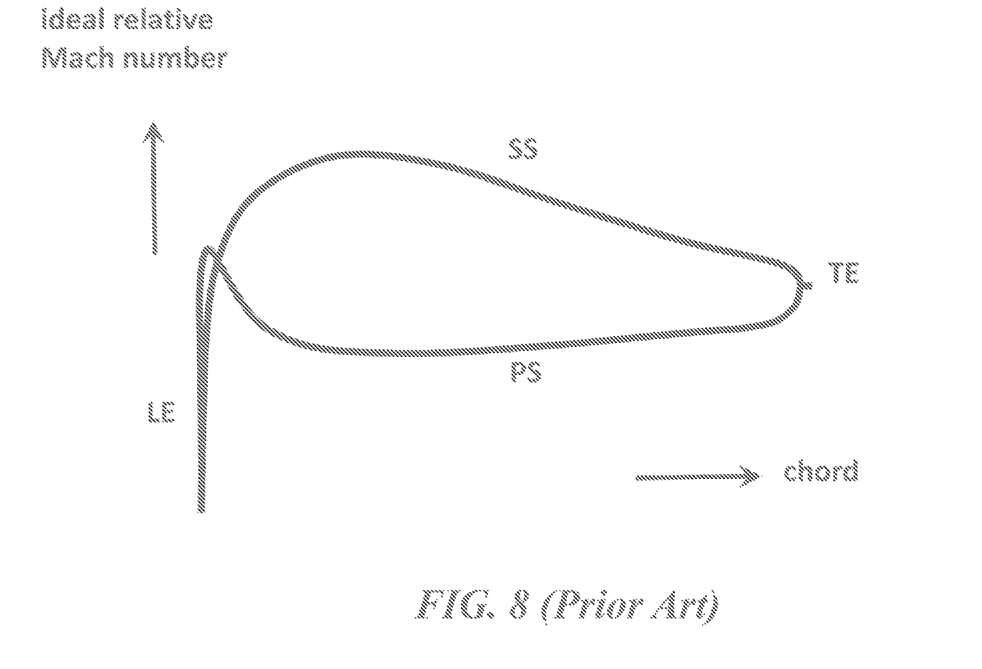
FIG. 8 is a plot of aerodynamic loading versus chord for a representative prior art airfoil section.

The combination of meanline shaping features described above may be applied so as to increase the uniformity of aerodynamic loading on the airfoil section in a chordwise direction, as compared to prior art designs. FIG. 8 is a plot illustrating the aerodynamic loading on a prior art open rotor airfoil section at its aerodynamic design point (ADP). It can be seen that the aerodynamic loading is non-uniform in the chordwise direction with the peak suction side (SS) ideal Mach number occurring in a front half of the chord. Ideal Mach number is a proxy for static pressure and is computed using the isentropic steady-flow relationship for an ideal gas.

Figure 9:
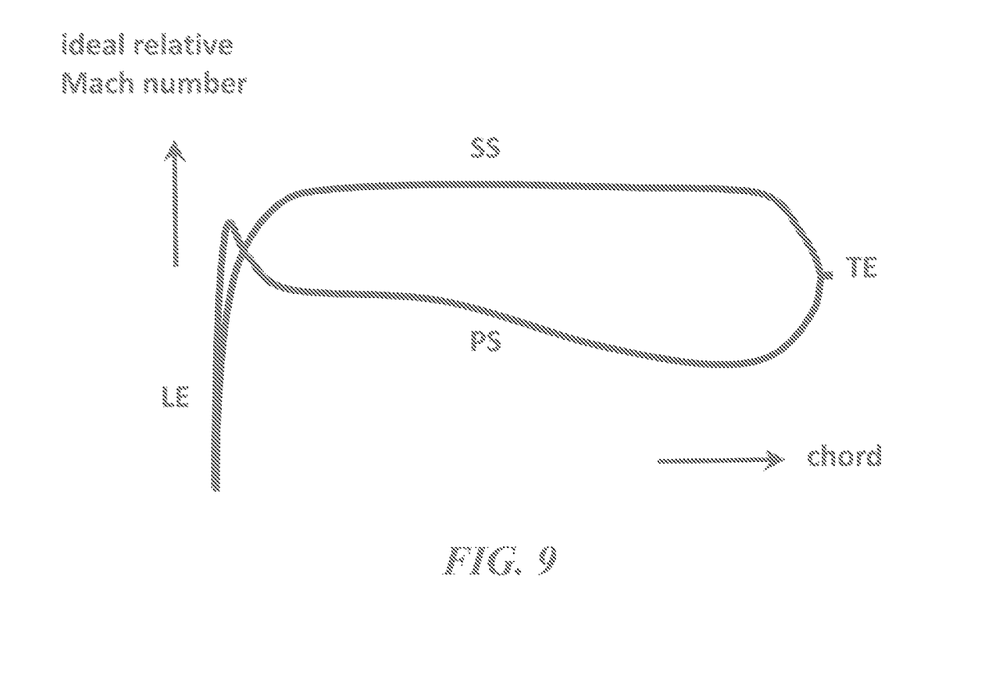
FIG. 9 is a plot of aerodynamic loading versus chord for an airfoil section in accordance with some embodiments.

In contrast, FIG. 9 is a plot illustrating the aerodynamic loading on an airfoil section at its ADP designed in accordance with the principles described herein (such as the airfoil section seen in FIG. 5). It can be seen that the suction side (SS) ideal Mach number is generally uniform (i.e. a flat horizontal line) over most of the chord while the pressure side (PS) ideal Mach number has a minimum toward the trailing edge (TE). More specifically, in one example, the meanline shaping can be such that, at a predetermined transonic or supersonic relative velocity condition, blade suction side maximum and minimum ideal Mach numbers lie within a 0.08 band for 75% or more of the region between 25% and 80% chordwise location of the chord. (Stated another way, the maximum ideal Mach number is not more than 0.08 greater than the minimum ideal Mach number between 25% and 80% chordwise locations of the chord, for at least 75% of that chord range). This near uniformity of static pressure can be expected in individual airfoil sections, typically in the outer ⅓ of the span. Considering sections further inboard (lower radii), the 0.08 Mach number band could extend over a smaller part of the chord, for example from 25% to 75% chordwise locations of the chord, or from 25% to 70% chordwise locations of the chord.

This near-uniform ADP chordwise SS pressure distribution has numerous benefits. Primarily, it will reduce cumulative supersonic compression and move the terminal shock near to the trailing edge 44. Deliberate placement of the terminal shock near the trailing edge is more predictable and less sensitive to minor aerodynamic variation, as compared to an upstream location, and reduces the strength of blade generated shocks away from the blades and beyond the blade tip radius. The weaker far-field pressure waves will cause less interior noise as they impinge the aircraft cabin.

Near-uniform pressure on the suction side delays flow deceleration, which increases aerodynamic efficiency by delaying laminar-to-turbulent boundary layer transition to a region further aft on the airfoil.

Finally, it has the potential to reduce blade far-field pressure wave strength at lower rotational speeds.

In some embodiments, a rotor blade described herein comprises higher solidities (longer chords) to reduce blade aerodynamic loading and chordwise SS pressure distributions are nominally flat with terminal compression located as far aft as practically achievable. In some embodiments, the rotor blade described herein minimizes SS Mach numbers (maximized SS pressures) and the overall strength of supersonic compressions. In some embodiments, a rotor blade comprises aft sweep to de-phase pressure waves and deconcentrate outward propagated pressure waves by spreading them over a larger axial distance. Aft sweep also tends to aerodynamically sweep the tip-region terminal shock and reduce its loss, and it allows relatively thick leading edges to be used without incurring aerodynamic penalties, even when blade relative inflow is supersonic. In some embodiments, the rotor blade comprises tip SS dihedral that further de-phases propagated pressure waves. In some embodiments, added acoustic benefit is realized by locating a terminal tip shock as far aft as possible, near the TE, while accelerating or reaccelerating the SS flow over the aft portion or aft half of the blade upstream of the terminal shock wave. This reduces the magnitude of the propagated pressure pulse by destructive interference.

The rotor blade design principles described above may be applied to various configurations of open rotors. For example, FIG. 1 shows an elevational cross-sectional view of an exemplary unducted propulsion system 100. As is seen from FIG. 1, the unducted propulsion system 100 takes the form of an open rotor propulsion system and has a rotating element 138 depicted as a propeller assembly which includes an array of blades 102 affixed to forward housing 106 and configured to rotate around an axis of rotation 120 of the unducted propulsion system 100. The unducted propulsion system 100 also includes in the exemplary embodiment a non-rotating stationary element 142 which includes an array of blades 104, also known as vanes, disposed around axis of rotation 120. These blades may be arranged such that they are not all equidistant from the propeller. These blades are mounted to a stationary frame and do not rotate relative to the central axis of rotation 120. The non-rotating stationary element 142 includes a stationary aft housing 126. Forward housing 106 and aft housing 126 have external surfaces that are three-dimensional. To explain the surface shaping guidance disclosed herein, parameters are defined along flowpath curves that correspond to intersecting the external surfaces with a plane that includes the axis of rotation. Accordingly, flowpath curve 105 corresponds to the intersection of forward housing 106 with an z-r plane that includes the axis of rotation. Similarly, the flowpath curve 125 corresponds to the intersection of aft housing 126 with an z-r plane that includes the axis of rotation. For reference purposes, FIG. 1 also depicts a forward direction denoted with arrow 118.

Radii $r_h$ 113, $r_m$ 117, $r_b$ 111, and axial distance $z_b$ 115 are also shown in FIG. 1. The annular area may be computed using $r_t$ 101, the radial distance from the axis of rotation 120 to a tip end of a blade 102 in the forward blade assembly, and the minimum radius of the fan stream tube at the same axial location As shown in FIG. 1, the exemplary unducted propulsion system 100 also includes a drive mechanism 128 which provides torque and power to the rotating element 138 through a transmission (not shown). In various embodiments, the drive mechanism 128, also known as an engine, may be a gas turbine engine, an electric motor, an internal combustion engine, or any other suitable source of torque and power and may be located in proximity to the rotating element 138 or may be remotely located with a suitably configured transmission. Transmission transfers power and torque from the drive mechanism 128 to the rotating element 138 and may include one or more shafts, gearboxes, or other mechanical or fluid drive systems. In FIG. 10, drive mechanism 128 is depicted schematically as comprising a gas generator 130 and a power turbine 132. An example of a turbomachine comprising a gas generator (e.g., compressor, combustor & high-speed turbine) and power turbine of a gas turbine engine is shown and described in US20210108597, hereby incorporated by reference in its entirety for all purposes. Alternative configurations to the one illustrated in FIG. 10 herein are depicted in U.S. Ser. No. 10/704,410, U.S. Pat. Nos. 5,190,441, 9,340,277, and U.S. Ser. No. 10/358,926, hereby each incorporated by reference in their entirety for all purposes.

Blades 102 of rotating element 138 are sized, shaped, and configured to produce thrust by moving a working fluid such as air in a direction 144 as shown in FIG. 10 when the rotating element 138 is rotated in a given direction around the axis of rotation 120. In doing so, blades 102 impart a degree of swirl to the fluid as it travels in the direction 144. Blades 104 of the stationary element are sized, shaped, and configured to decrease the swirl magnitude of the fluid, so as to increase the kinetic energy that generates thrust for a given shaft power input to the rotating element. Each rotating blade 102 has blade root 122 and blade tip 124. Each stationary blade 104 has a blade root 136 and blade tip 134. For both rotating blades 102 and stationary blades 104, span is defined as the distance between root and tip. Stationary blades 104 may have a shorter span than rotating blades 102, for example, 50% of the span of blades 102, or may have longer span or the same span as blades 102 as desired. In FIG. 10, stationary blades 104 are shown affixed to the housing 126 at their respective blade roots 136. In some embodiments some or all stationary blades 104 may be affixed to, or integrated with, the aircraft structure, such as a wing, pylon, or fuselage. The number of blades 104 of the stationary element may be fewer or greater than, or the same as, the number of blades 102 of the rotating element and is typically greater than two, or greater than four. In some embodiments a ratio of the number of rotating blades 102 to a number of stationary blades 104 is between 2:5 and 2:1. In some embodiments a difference between the number of rotating blades 102 to a number of stationary blades 104 is between 2 and −2. Span of blade 102 is defined as the distance between blade root 122 and blade tip 124. In one embodiment, the blades 102 have a maximum axial distance/width 140 near mid span (i.e., 50% of the blade height from the blade root to blade tip). In one embodiment, the blades 102 are affixed to the forward housing 106 or spinner such that, when oriented or configured for cruise operation, the forward-most point of the blade roots 122 is proximal to the local minimum having second radius, and such that 0 to 40 percent of the maximum width 140 is located forward of the forward-most point of the blade roots 122. In another embodiment, 20 to 40 percent of the maximum width 140 is located forward of the forward-most point of the blade roots 122.

Blades 104 of the stationary element 142 may be positioned aerodynamically upstream of the rotating blades 102 to serve as counter swirl vanes, i.e., imparting a tangential velocity which is opposite to the rotation direction of the rotating element 138. Alternatively, and as shown in FIG. 10, stationary blades 104 may be positioned aerodynamically downstream of the rotating blades 102 to serve as de-swirl vanes, i.e., imparting a change in tangential velocity which is counter to that of the rotating element 138. Any swirl remaining in the airstream downstream of the unducted propulsion system 100 equates to a loss in thrust producing kinetic energy.

It may be desirable that either or both of the sets of rotating blades 102 and stationary blades 104 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

An inlet 127 is located axially between the blades 104 and blades 102. Alternatively, the inlet 127 may be located elsewhere, for example, forward of the blades 102. A ratio of a mass of air accelerated by the rotating blades 102 and bypassing the inlet 127 to the mass of air accelerated by the rotating blades and entering the engine core (not shown) via the inlet 127 is known as the bypass ratio. In some embodiments, a ratio of the sweep area of the blades (computed as $\pi \times [(\text{blade tip radius}) - (\text{blade root radius})^2]$ to the cross-sectional area of the inlet (as measured in a z-r plane) is greater than 20:1 or greater than 30:1, and less than 80:1.

It will be appreciated that the exemplary unducted propulsion system 100 depicted in FIG. 10 is by way of example only. In other exemplary embodiments, it may have other suitable configurations. For example, instead of being a forward rotating blade assembly and an aft stationary blade assembly as shown, the two blade assemblies could be counter-rotating with respect to one another. As another example, the forward blade assembly could be stationary and the aft blade assembly could be rotating. As another example, the unducted propulsion system may consist of only a rotating blade assembly, i.e., a propeller.

FIG. 11 is a perspective view of an exemplary gas turbine engine attached to a wing of an aircraft in accordance with some aspects of the present disclosure. FIG. 11 depicts the unducted propulsion system 100 mounted to a wing 218 via a pylon 220 to facilitate mounting to, or accommodation of the airframe structure. Additionally, each of blades may not all be equally spaced from each other and/or at the same axial, z, location. These are examples of where a housing 126 may not be axisymmetric.

The unducted propulsion system 100 includes a turbomachine substantially contained within a forward housing 106 or spinner and aft housing 126. In some configurations, both the forward housing 106 and the aft housing 126 include rotating hubs associated with rotating blades 102 and blades 104, respectively. In other configurations, one of the forward housing 106 and the aft housing 126 are entirely rotating or include a rotating structure such as a rotating hub, while the other is a stationary housing associated with respective rotating and stationary blades. In some embodiments, forward housing 106 may be considered a spinner and aft housing 126 may be considered a nacelle. Aft housing 126 may contain a compressor, combustor, and turbine of a turbomachine, followed by engine exit 121.

In an illustrative non-limiting example as depicted in FIG. 11, the unducted propulsion system 100 includes a rotating assembly (or rotor) that includes a forward housing 106 and airfoil-shaped assembly of blades 102 (may also be referred to as a fan, rotor, or propeller) associated with the forward housing 106. In this example, the forward housing 106 is a spinner that rotates about an axis of rotation 120. In other configurations the forward housing may not be rotating, as when the system is comprised of a stationary forward blade assembly and rotating aft blade assembly. The unducted propulsion system 100 also includes a stationary assembly that may include the engine inlet 127 and airfoil shaped stationary assembly of blades 104 associated with aft housing 126. In such a configuration, the housing 126 is non-rotating, as are the blades 104, about the axis of rotation 120 although the blades may separately articulate to modify a pitch, lean or sweep angle, e.g., via a mechanism contained within housing 126. At least one of the functions of the stationary assembly of blades 104 is to remove swirl from air stream leaving the rotor.

Aft housing 126 extends in an axial direction from engine inlet 127 to the engine exit 121. The aft housing 126 contains the internal machinery that produces torque for the assembly of blades 102 and defines a surface shaped to provide aerodynamic efficiency (reduce drag) for air passing through blades 102 and 104 and proceeding downstream. The stream exhausted from the engine exit 121 produces some of the thrust that propels and/or advances an aircraft forward. Most of the thrust produced by an engine of the unducted propulsion system 100 comes from accelerated air that passes over the housing 126, or the air that passes through the blades 104 and bypasses the inlet 127. In some embodiments, the engine may additionally include a third stream (the first and second streams being the bypass and turbomachine core airstream defined by a compressor, combustor, and turbine).

For simplicity of illustration in FIG. 11, forward housing 106 is shown as a continuous spinner. However, each housing may be comprised of separate parts with various mechanical components to allow variable pitch angle of the forward assembly of blades 102 and/or aft assembly of blades 104. The axial extent of such specialized parts of each housing may be approximately the same as a corresponding axial extent of the assembly of blades 102 and/or assembly of blades 104, or the axial extents of the housings may be shorter or longer (in axial extent) than the span of blades or respective axial extents of the blade assemblies. The dot-dashed line in FIG. 11 indicates an axis of rotation 120 for the blades 102. The dashed curves, 105 and 125, represent flowpath curves corresponding to the intersection of housings 106 and 126, respectively, with a plane that includes axis of rotation 120. In the illustrative example in which forward housing 106 and the associated forward assembly of blades 102 are rotating about axis of rotation 120, the shape of the flowpath curve may be defined by an effective radius vs. axial distance parallel to the axis of rotation 120. However, in this example in which the aft housing 126 and the associated aft assembly of blades 104 do not rotate about axis of rotation 120, the flowpath curve shape of radius vs. axal location depends on the orientation of the z-r plane about the axis of rotation, i.e., curve could have a different shape for different positions of the plane that intersects aft housing 126.

The foregoing has described an airfoil for an open rotor and an open rotor apparatus. All of the features disclosed in this specification (including any accompanying claims, abstract and drawings), and/or all of the steps of any method or process so disclosed, may be combined in any combination, except combinations where at least some of such features and/or steps are mutually exclusive.

A blade for an open rotor, comprising a pressure side and a suction side, the pressure side and the suction side intersecting at a leading edge and a trailing edge, wherein at each spanwise location, a chord of an airfoil section is defined as a straight line distance between the leading edge and the trailing edge and a meanline is defined midway between the pressure side and the suction side, and wherein for at least 30% of a span of the blade, the meanline of the airfoil section is shaped such that, in the presence of transonic or supersonic relative velocity conditions, maximum and minimum ideal Mach numbers on the suction side will lie within a 0.08 band for 75% or more of a region between 25% and 80% chordwise location of the chord of the airfoil section.

The blade of any preceding clause wherein a thickness of the airfoil section is defined as a distance measured normal to the meanline between the pressure side and the suction side, and wherein for between 30% and 90% of the span of the blade, a maximum value of the thickness of the airfoil section occurs at a location between about 0% to about 35% chordwise location of the chord.

The blade of any preceding clause wherein for between 30% and 90% spanwise location of the span of the blade, the airfoil section has a maximum thickness of about 2% to about 7% of the chord.

The blade of any preceding clause wherein the blade is part of an aircraft with designated cruise flight Mach number at or above 0.74.

The blade of any preceding clause wherein a majority of the leading edge of the blade has an aft sweep equal to or greater than a predetermined sweep profile, wherein the predetermined sweep profile is selected to produce a blade-relative velocity component perpendicular to the leading edge, at a tip radius of the blade, of Mach 0.75 or less, and to produce a blade-relative velocity component perpendicular to the leading edge, at 65% of the tip radius, of Mach 0.87 or less, in the presence of transonic or supersonic relative velocities near the blade.

The blade of any preceding clause, wherein, under transonic or supersonic relative velocity conditions, the blade has a spanwise ΔRCu distribution such that at any location between a blade root and 30% spanwise location of the blade, the value of ΔRCu is greater than or equal to 70% of the peak ΔRCu.

The blade of any preceding clause wherein a tip section of the blade has suction side dihedral such that a tip section leading edge is displaced in the direction perpendicular to a blade section chord line at a radius 85% of a tip radius, by an amount 10% or greater of a circumferential blade tip spacing.

The blade of any preceding clause wherein row aerodynamic solidity of the blade at 0% spanwise location is between 1.0 and 3.6, and at 100% spanwise location is between 0.0 and 0.8.

The blade of any preceding clause wherein for between 30% and 90% of the span of the blade, the leading edge has a thickness greater than 0.45% of the chord, measured at a 0.5% chordwise location.

A blade for an open rotor, comprising a pressure side and a suction side, the pressure side and the suction side intersecting at a leading edge and a trailing edge, wherein at each spanwise location, a chord of an airfoil section is defined as a straight line distance between the leading edge and the trailing edge and a meanline is defined midway between the pressure side and the suction side; and wherein for at least 30% of a span of the blade, the meanline of the airfoil section is shaped such that a relative curvature parameter is greater than 1.75 in a first region, less than 0.75 in a second region, and greater than 1.2 in a third region, wherein the relative curvature parameter of a region is defined by $\Delta\zeta_n/\Delta\zeta_{rot}/\Delta(x/c)_n$ wherein $\zeta$ corresponds to the inverse tangent of the slope of a meanline curve, subscript n indicates the region, and x/c is a chordwise location normalized by the chord; and wherein for between 30% and 90% spanwise location of the span of the blade, the airfoil section has a maximum thickness of about 2% to about 7% of the chord.

The blade of any preceding clause wherein a thickness of the airfoil section is defined as a distance measured normal to the meanline between the pressure side and the suction side, and wherein for between 30% and 90% spanwise location of the span of the blade, a maximum value of the thickness of the airfoil section occurs at a location between about 0% to about 35% chordwise location of the chord.

The blade of any preceding clause wherein a tip section of the blade has suction side dihedral such that a tip section leading edge is displaced in the direction perpendicular to a blade section chord line at a radius 85% of a tip radius, by an amount 10% or greater of a circumferential blade tip spacing.

The blade of any preceding clause wherein row aerodynamic solidity of the blade at 0% spanwise location is between 1.0 and 3.6, and at 100% spanwise location is between 0.0 and 0.8.

The blade of any preceding clause wherein for between 30% and 90% of the span of the blade, the leading edge has a thickness greater than 0.45% of the chord, measured at a 0.5% chordwise location.

The blade of any preceding clause wherein for 50% of the span of the blade, the meanline of the airfoil section is shaped such that the relative curvature parameter is greater than 1.75 in the first region, less than 0.75 in the second region, and greater than 1.2 in the third region.

The blade of any preceding clause wherein the first region comprises at least x/c=0.0 to 0.10 and the third region comprises at least x/c=0.85 to 1.0.

The blade of any preceding clause wherein the first region corresponds to x/c=0.0 to 0.15, the second region corresponds to x/c=0.15 to 0.75, and the third region corresponds to x/c=0.75 to 1.0.

A blade for an open rotor comprising a pressure side and a suction side, the pressure side and the suction side intersecting at a leading edge and a trailing edge, wherein at each spanwise location, a chord of an airfoil section is defined as a straight line distance between the leading edge and the trailing edge and a meanline is defined midway between the pressure side and the suction side, and wherein for at least 30% of a span of the blade, the meanline of the airfoil section is shaped such that a relative curvature parameter is greater than 1.75 in a first region, less than 0.75 in a second region, and greater than 1.2 in a third region, wherein the relative curvature parameter of a region is defined by $\Delta\zeta_n/\Delta\zeta_{rot}/\Delta(x/c)_n$ wherein $\zeta$ corresponds to the inverse tangent of the slope of a meanline curve, subscript n indicates the region, and x/c is a chordwise location normalized by the chord, and wherein the first region comprises at least x/c=0.0 to 0.10 and the third region comprises at least x/c=0.85 to 1.0.

The blade of any preceding clause wherein a thickness of the airfoil section is defined as a distance measured normal to the meanline between the pressure side and the suction side, and wherein for between 30% and 90% spanwise location of the span of the blade, a maximum value of the thickness of the airfoil section occurs at a location between about 0% to about 35% chordwise location of the chord.

The blade of any preceding clause wherein for between 30% and 90% spanwise location of the span of the blade, the airfoil section has a maximum thickness of about 2% to about 7% of the chord.

The blade of any preceding clause wherein the blade is part of an aircraft with designated cruise flight Mach number at or above 0.74.

The blade of any preceding clause wherein a majority of the leading edge of the blade has an aft sweep equal to or greater than a predetermined sweep profile, wherein the predetermined sweep profile is selected to produce a blade-relative velocity component perpendicular to the leading edge, at a tip radius of the blade, of Mach 0.75 or less, and to produce a blade-relative velocity component perpendicular to the leading edge, at 65% of the tip radius, of Mach 0.87 or less, in the presence of transonic or supersonic relative velocities near the blade.

The blade of any preceding clause wherein, under transonic or supersonic relative velocity conditions, the blade has a $\Delta$RCu distribution such that at any location between a blade root and 30% spanwise location of the blade, the value of $\Delta$RCu is greater than or equal to 70% of the peak $\Delta$RCu.

The blade of any preceding clause wherein a tip section of the blade has suction side dihedral such that a tip section leading edge is displaced in the direction perpendicular to a blade section chord line at a radius 85% of a tip radius, by an amount 10% or greater of a circumferential blade tip spacing.

The blade of any preceding clause wherein row aerodynamic solidity of the blade at 0% spanwise location is between 1.0 and 3.6, and at 100% spanwise location is between 0.0 and 0.8.

The blade of any preceding clause wherein for between 30% and 90% of the span of the blade, the leading edge has a thickness greater than 0.45% of the chord, measured at a 0.5% chordwise location.

The blade of any preceding clause wherein for 50% of the span of the blade, the meanline of the airfoil section is shaped such that the relative curvature parameter is greater than 1.75 in the first region, less than 0.75 in the second region, and greater than 1.2 in the third region.

The blade of any preceding clause wherein the first region corresponds to x/c=0.0 to 0.15, the second region corresponds to x/c=0.15 to 0.75, and the third region corresponds to x/c=0.75 to 1.0.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

What is claimed is:

1. A blade for an open rotor, comprising:
  a pressure side and a suction side, the pressure side and the suction side intersecting at a leading edge and a trailing edge, wherein at each spanwise location, a chord of an airfoil section is defined as a straight line distance between the leading edge and the trailing edge and a meanline is defined midway between the pressure side and the suction side;
  wherein for at least 30% of a span of the blade, the meanline of the airfoil section is shaped such that a relative curvature parameter is greater than 1.75 in a first region, less than 0.75 in a second region, and greater than 1.2 in a third region, wherein the relative curvature parameter of a region is defined by $\Delta\zeta_n/\Delta\zeta_{tot}/\Delta(x/c)_n$, wherein $\zeta$ corresponds to the inverse tangent of the slope of a meanline curve, $\Delta\zeta_{tot}$ corresponds to a total change in meanline angle, subscript n indicates the region, and x/c is a chordwise location normalized by the chord; and wherein the first region comprises at least x/c=0.0 to 0.10 and the third region comprises at least x/c=0.85 to 1.0.

2. The blade of claim 1, wherein a thickness of the airfoil section is defined as a distance measured normal to the meanline between the pressure side and the suction side, and wherein for between 30% and 90% spanwise location of the span of the blade, a maximum value of the thickness of the airfoil section occurs at a location between about 0% to about 35% chordwise location of the chord.

3. The blade of claim 1, wherein for between 30% and 90% spanwise location of the span of the blade, the airfoil section has a maximum thickness of about 2% to about 7% of the chord.

4. The blade of claim 1, wherein the blade is part of an aircraft with designated cruise flight Mach number at or above 0.74.

5. The blade of claim 1, wherein a majority of the leading edge of the blade has an aft sweep equal to or greater than a predetermined sweep profile, wherein the predetermined sweep profile is selected to produce a blade-relative velocity component perpendicular to the leading edge, at a tip radius of the blade, of Mach 0.75 or less, and to produce a blade-relative velocity component perpendicular to the leading edge, at 65% of the tip radius, of Mach 0.87 or less, in the presence of transonic or supersonic relative velocities near the blade.

6. The blade of claim 1, wherein, under transonic or supersonic relative velocity conditions, the blade has a $\Delta$RCu distribution such that at any location between a blade root and 30% spanwise location of the blade, the value of $\Delta$RCu is greater than or equal to 70% of the peak $\Delta$RCu.

7. The blade of claim 1, wherein a tip section of the blade has suction side dihedral such that a tip section leading edge is displaced in the direction perpendicular to a blade section chord line at a radius 85% of a tip radius, by an amount 10% or greater of a circumferential blade tip spacing.

8. The blade of claim 1, wherein row aerodynamic solidity of the blade at 0% spanwise location is between 1.0 and 3.6, and at 100% spanwise location is between 0.0 and 0.8.

9. The blade of claim 1, wherein for between 30% and 90% of the span of the blade, the leading edge has a thickness greater than 0.45% of the chord, measured at a 0.5% chordwise location.

10. A blade of claim 1, wherein for 50% of the span of the blade, the meanline of the airfoil section is shaped such that the relative curvature parameter is greater than 1.75 in the first region, less than 0.75 in the second region, and greater than 1.2 in the third region.

11. The blade of claim 1, wherein the first region corresponds to x/c=0.0 to 0.15, the second region corresponds to x/c=0.15 to 0.75, and the third region corresponds to x/c=0.75 to 1.0.

12. A blade for an open rotor, comprising:
a pressure side and a suction side, the pressure side and the suction side intersecting at a leading edge and a trailing edge, wherein at each spanwise location, a chord of an airfoil section is defined as a straight line distance between the leading edge and the trailing edge and a meanline is defined midway between the pressure side and the suction side;

wherein for at least 30% of a span of the blade, the meanline of the airfoil section is shaped such that a relative curvature parameter is greater than 1.75 in a first region, less than 0.75 in a second region, and greater than 1.2 in a third region, wherein the relative curvature parameter of a region is defined by $\Delta\zeta_n/\Delta\zeta_{tot}/\Delta(x/c)_n$, wherein $\zeta$ corresponds to the inverse tangent of the slope of a meanline curve, $\Delta\zeta_{tot}$ corresponds to a total change in meanline angle, subscript n indicates the region, and x/c is a chordwise location normalized by the chord; and wherein for between 30% and 90% spanwise location of the span of the blade, the airfoil section has a maximum thickness of about 2% to about 7% of the chord.

13. The blade of claim 12, wherein a thickness of the airfoil section is defined as a distance measured normal to the meanline between the pressure side and the suction side, and wherein for between 30% and 90% spanwise location of the span of the blade, a maximum value of the thickness of the airfoil section occurs at a location between about 0% to about 35% chordwise location of the chord.

14. The blade of claim 12, wherein a tip section of the blade has suction side dihedral such that a tip section leading edge is displaced in the direction perpendicular to a blade section chord line at a radius 85% of a tip radius, by an amount 10% or greater of a circumferential blade tip spacing.

15. The blade of claim 12, wherein row aerodynamic solidity of the blade at 0% spanwise location is between 1.0 and 3.6, and at 100% spanwise location is between 0.0 and 0.8.

16. The blade of claim 12, wherein for between 30% and 90% of the span of the blade, the leading edge has a thickness greater than 0.45% of the chord, measured at a 0.5% chordwise location.

17. A blade of claim 12, wherein for 50% of the span of the blade, the meanline of the airfoil section is shaped such that the relative curvature parameter is greater than 1.75 in the first region, less than 0.75 in the second region, and greater than 1.2 in the third region.

18. The blade of claim 12, wherein the first region comprises at least x/c=0.0 to 0.10 and the third region comprises at least x/c=0.85 to 1.0.

19. The blade of claim 12, wherein the first region corresponds to x/c=0.0 to 0.15, the second region corresponds to x/c=0.15 to 0.75, and the third region corresponds to x/c=0.75 to 1.0.

* * * * *

UNITED STATES PATENT AND TRADEMARK OFFICE
CERTIFICATE OF CORRECTION

PATENT NO. : 11,608,743 B1
APPLICATION NO. : 17/665483
DATED : March 21, 2023
INVENTOR(S) : Tweedt et al.

It is certified that error appears in the above-identified patent and that said Letters Patent is hereby corrected as shown below:

In the Claims

In Column 17, Claim 10, Line 53, delete "A blade" and insert -- The blade --, therefor.

In Column 18, Claim 17, Line 48, delete "A blade" and insert -- The blade --, therefor.

Signed and Sealed this
Twenty-seventh Day of June, 2023

Katherine Kelly Vidal
*Director of the United States Patent and Trademark Office*